No. 886,045.

PATENTED APR. 28, 1908.

H. J. & H. B. EHRLICH.

VALVE.

APPLICATION FILED MAR. 6, 1906.

Witnesses
Stuart Hilder
George M. Anderson

Inventors
H. J. Ehrlich
H. B. Ehrlich
By E. W. Anderson
his Attorney

UNITED STATES PATENT OFFICE.

HERMAN J. EHRLICH AND HERMAN B. EHRLICH, OF BRAZIL, INDIANA.

VALVE.

No. 886,045.  Specification of Letters Patent.  Patented April 28, 1908.

Application filed March 6, 1906. Serial No. 304,606.

*To all whom it may concern:*

Be it known that we, HERMAN J. EHRLICH and HERMAN B. EHRLICH, citizens of the United States, residents of Brazil, in the county of Clay and State of Indiana, have made a certain new and useful Invention in Valves; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
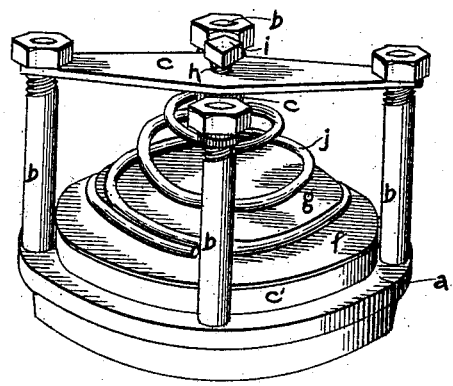
Figure 2:
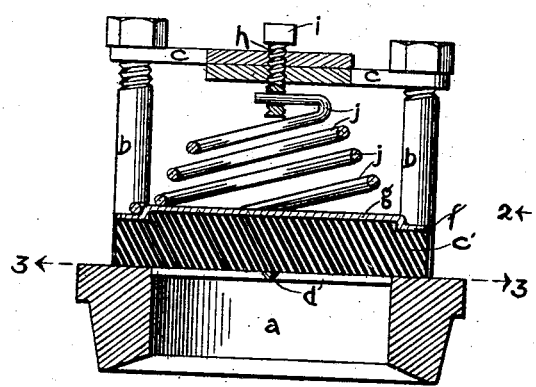
Figure 3:
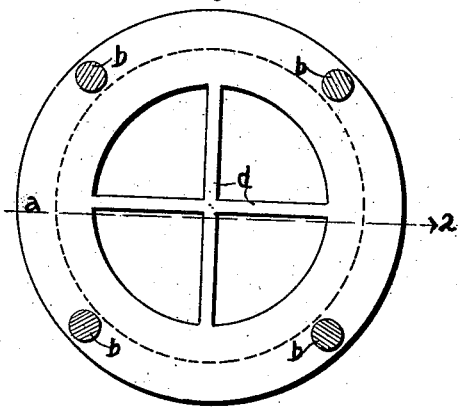

Figure 1 is a perspective view of our valve. Fig. 2 is a section on the line 2—2, Fig. 3. Fig. 3 is a section on the line 3—3, Fig. 2.

The invention has relation to valves, having for its object the provision of an improved device of this character, which will be efficient, economical, and durable.

With this object in view, the invention consists in the novel construction and combinations of parts, as hereinafter set forth.

In the accompanying drawings, illustrating the invention, the letter $a$ designates the valve seat, having four standards or extensions $b$ connected at their outer ends by cross pieces $c$ having perforated ends fitting over such standards, forming a valve cage. Securing nuts are provided for the cross pieces, such nuts engaging the threaded outer end portions of the standards. The valve seat has cross bars $d$ flush with its outer surface to keep the valve from cupping. These cross bars are of slender character.

$c'$ is the valve, which is solid or imperforate, fitting closely within the extensions of the seat, and normally resting upon the seat and its cross bars. This valve is usually formed of rubber as shown, and has a metal head $f$ connected to the body of the valve in any suitable manner, said head having a central boss or extension $g$.

The cruciform connections of the extensions $b$ are provided with central threaded alined perforations $h$, for the engagement of a set screw $i$, having a slotted inner end for connection of the smaller end of a conical coil spring $j$, extending from the set screw $i$ to the valve around the central boss of the head thereof, which boss is large compared with the diameter of the set screw.

Our invention dispenses with a stem to the valve, and provides a solid valve, increasing the durability of the parts and preventing leakage. We also dispense with a web in the seat which is liable to choke through accumulations. By means of the set screw having connection with the valve spring the tension of the spring may be readily adjusted to suit the requirements or take up wear. The valve is confined in the cage for a true movement.

Having thus described our invention, what we claim and desire to secure by Letters Patent is:—

A valve having a seat provided with separated standards having threaded outer end portions, removable cross pieces having perforated ends fitting over said standards, securing nuts engaging the threaded end portions of said standards, said cross pieces having central threaded alined perforations, a set screw engaging the central perforations of the cross pieces, and having a slotted inner end portion, a valve having a metal head provided with a central boss, and a conically coiled spring having its contracted end portion engaging the slot of said set screw and having its expanded end portion surrounding the central boss of the metal head and in contact with the valve.

In testimony whereof we affix our signatures, in presence of two witnesses.

HERMAN J. EHRLICH.
HERMAN B. EHRLICH.

Witnesses:
A. W. SHAFFER,
F. A. KERR.